United States Patent Office 3,267,118
Patented August 16, 1966

3,267,118
1,4 - BIS - (2-TETRAHYDROPYRANYLMETHYL-AMINOMETHYL) - CYCLOHEXANE AND SALTS THEREOF
Leslie G. Humber, Montreal, Quebec, Canada, assignor to American Home Products Corporation, New York, N.Y., a corporation of Delaware
No Drawing. Filed July 30, 1963, Ser. No. 298,560
3 Claims. (Cl. 260—345.9)

This invention relates to novel chemical compounds, certain new derivatives of tetrahydropyran, and to the process utilized in their preparation.

More particularly, my invention relates to bis-(2-tetrahydropyranylmethylaminomethyl)-derivatives, which new chemical compounds possess valuable pharmacological properties.

The new chemical compounds, in base form, may be represented by the Formula I shown below:

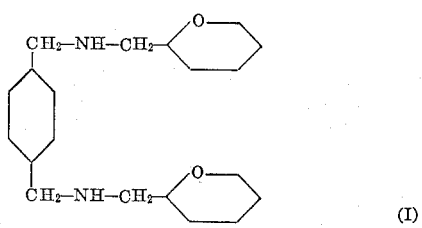

It is generally understood that compounds of the type shown above are capable of existing in two geometrically isomeric forms, commonly called cis and trans depending on the orientation of the two side chains which are attached to the central nucleus. It is understood that the geometrical isomers referred to are intended to be within the scope of this invention.

The novel chemical compounds possessing interesting biological activities are basic in nature and, thus, they form tertiary acid addition salts. Such salts with pharmacologically acceptable acids are biologically equivalent to the free base and constitute a preferred form for the administration of the compounds of my invention.

The new chemical compounds forming the subject of this invention are useful as agents for lowering serum cholesterol levels.

My preferred procedure for preparing the new chemical compounds of this invention may be described schematically as follows:

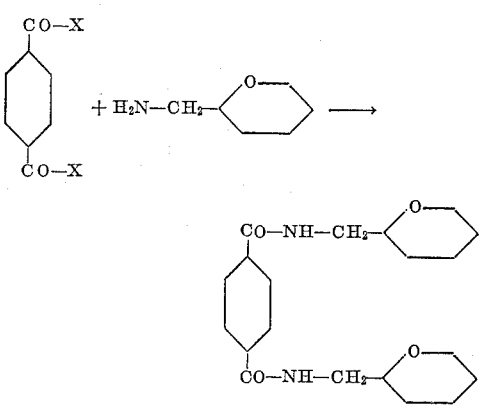

wherein X is a halogen and [H] is a reducing agent such as, for example, lithium aluminum hydride.

My invention may be illustrated by the following examples, which should be regarded as illustrative of this invention, rather than as limiting the same.

*Example 1.—N,N'-di(2-tetrahydropyranylmethyl)-cyclohexane-1,4-biscarboxamide*

Cyclohexane-1,4-dicarbonyl chloride (6.3 gm.) (prepared from the corresponding diacid and thionyl chloride) and 2-tetrahydropyranylmethylamine (13.8 gm.) were combined in benzene solution and refluxed for 4 hours. The solid which formed in the reaction mixture was isolated by filtration, washed with water and crystallized from a methanol-water mixture. It had M.P. 246–248° C. and analysis confirmed the empirical formula $C_{20}H_{34}N_2O_4$.

*Example 2.—1,4-bis-(2-tetrahydropyranylmethylaminomethyl)-cyclohexane*

The diamide of Example 1 (8.6 gm.) and lithium aluminum hydride (6.6 gm.) were combined in anhydrous tetrahydrofuran and refluxed for 20 hours. Water (27.8 ml.) was cautiously added, the mixture filtered and the filtrate dried ($Na_2SO_4$) and evaporated to yield the title compound as a yellow oil.

The dihydrochloride salt was prepared in the usual manner. It was crystallized from aqueous acetone and had M.P. 313–315° C. Analysis confirmed the empirical formula $C_{20}H_{40}N_2O_2Cl_2$.

I claim:
1. A compound selected from the group which consists of the compounds of Formula I:

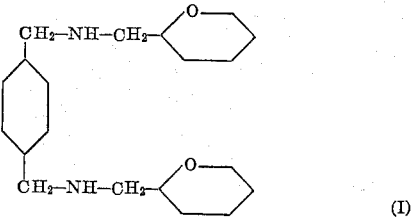

and salts thereof with pharmacologically acceptable acids.

2. A compound of the Formula I

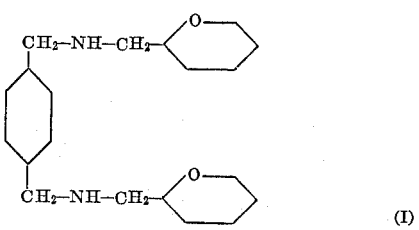

3. The hydrochloric acid salt of 1,4-bis-(2-tetrahydropyranylmethylaminomethyl)-cyclohexane.

References Cited by the Examiner
UNITED STATES PATENTS
3,210,361  10/1965  Humber _____ 260—329 XR WALTER A. MODANCE, *Primary Examiner.*
NORMA S. MILESTONE, *Examiner.*